(12) United States Patent
Park

(10) Patent No.: US 8,800,472 B2
(45) Date of Patent: Aug. 12, 2014

(54) PRECISE CRITICAL TEMPERATURE INDICATOR AND MANUFACTURING METHOD THEREFOR

(75) Inventor: Ji Hoon Park, Suwon (KR)

(73) Assignee: Intellectual Discovery, Inc., Seoul (KR)

( * ) Notice: Subject to any disclaimer, the term of this patent is extended or adjusted under 35 U.S.C. 154(b) by 429 days.

(21) Appl. No.: 13/125,802

(22) PCT Filed: Oct. 21, 2009

(86) PCT No.: PCT/KR2009/006088
§ 371 (c)(1),
(2), (4) Date: May 27, 2011

(87) PCT Pub. No.: WO2010/047527
PCT Pub. Date: Apr. 29, 2010

(65) Prior Publication Data
US 2011/0214602 A1   Sep. 8, 2011

(30) Foreign Application Priority Data

Oct. 24, 2008 (KR) .................. 10-2008-0104758
Jul. 20, 2009 (KR) .................. 10-2009-0065770

(51) Int. Cl.
*G01K 11/12* (2006.01)
*G01K 3/04* (2006.01)
(52) U.S. Cl.
USPC ................. 116/219; 374/102; 374/162
(58) Field of Classification Search
USPC ............. 116/206, 207, 216, 217, 218, 219; 374/102, 104, 106, 159, 160, 161, 162
See application file for complete search history.

(56) References Cited

U.S. PATENT DOCUMENTS

| | | | | |
|---|---|---|---|---|
| 2,614,430 A | * | 10/1952 | Ballard et al. | 374/106 |
| 3,954,011 A | * | 5/1976 | Manske | 374/102 |
| 3,958,528 A | | 5/1976 | Hill | |
| 3,962,920 A | * | 6/1976 | Manske | 374/102 |
| 4,064,872 A | * | 12/1977 | Caplan | 374/162 |
| 4,233,801 A | * | 11/1980 | Watt | 53/453 |
| 4,408,557 A | * | 10/1983 | Bradley et al. | 116/206 |
| 4,996,104 A | | 2/1991 | Nicholas et al. | |
| 5,102,233 A | | 4/1992 | Staerk et al. | |

(Continued)

FOREIGN PATENT DOCUMENTS

| JP | 6115532 | 1/1966 |
|---|---|---|
| JP | 50-060262 A | 5/1975 |

(Continued)

Primary Examiner — R. A. Smith
(74) *Attorney, Agent, or Firm* — Rothwell, Figg, Ernst & Manbeck, P.C.

(57) ABSTRACT

A precise critical temperature indicator is applied to small products requiring refrigeration or freezing to control the operation of a temperature sensor built into an integrated structure of a single body. A method for manufacturing said precise critical temperature indicator, wherein a plurality of development medium members and a plurality of development material members are opposed to each other, and blocking members are interposed therebetween to support the development medium members and the development material members separately from each other, the development medium members are provided with paths for moving development materials, or paths for movement of development materials can be shortened to adjust speed, and an indication unit is arranged to indicate the state of the development materials at an end or central portion of the development medium when the development materials are exposed to a critical temperature for a predetermined time period.

5 Claims, 17 Drawing Sheets

(56) References Cited

U.S. PATENT DOCUMENTS

| | | |
|---|---|---|
| 5,120,137 A | 6/1992 | Ou-Yang |
| 5,282,684 A | 2/1994 | Holzer |
| 5,997,964 A * | 12/1999 | Klima, Jr. .................. 428/1.54 |
| 6,896,296 B2 * | 5/2005 | Shadle et al. .................. 283/95 |
| 6,957,623 B2 * | 10/2005 | Guisinger et al. ............ 116/216 |
| 6,968,804 B1 * | 11/2005 | Barbieri et al. ............... 116/219 |
| 7,232,253 B2 * | 6/2007 | Isbitsky et al. .................. 368/89 |
| 2004/0240324 A1 * | 12/2004 | Isbitsky et al. .................. 368/327 |
| 2011/0280775 A1 * | 11/2011 | Suda et al. .................... 422/424 |

FOREIGN PATENT DOCUMENTS

| | | |
|---|---|---|
| JP | 52003479 | 1/1977 |
| JP | 59-122921 | 7/1984 |
| JP | 01-116421 | 5/1989 |
| JP | 04-294386 A | 10/1992 |
| JP | 06-050826 | 2/1994 |
| JP | 09-323765 A | 12/1997 |
| JP | 10-267761 A | 10/1998 |
| JP | 2002-181635 A | 6/2002 |
| JP | 2002-365145 A | 12/2002 |
| JP | 2004-257828 A | 9/2004 |
| JP | 2005-308237 | 11/2005 |
| KR | 10-2003-0082364 A | 10/2003 |
| KR | 10-2005-0074008 A | 7/2005 |
| KR | PCT/KRS2009/006088 | 10/2009 |
| WO | 03/077227 A2 | 9/2003 |
| WO | WO 2007148321 A2 * | 12/2007 |
| WO | 2010/047527 A2 | 4/2010 |
| WO | WO 2010/074529 | 7/2010 |

\* cited by examiner

PRECISE CRITICAL TEMPERATURE INDICATOR AND MANUFACTURING METHOD THEREFOR

This is a 35 U.S.C. §371 application of, and claims priority to, International Application No. PCT/KR2009/006088, which was filed on Oct. 21, 2009, and which claims priority to Korean Patent Application No. 10-2008-0104758, which was filed on Oct. 24, 2008, and No. 10-2009-0065770, which was filed on Jul. 20, 2009 and the teachings of all the applications are incorporated herein by reference.

TECHNICAL FIELD

The present invention relates to a critical temperature indicator, in particular to a precise critical temperature indicator to be easily adapted to relatively smaller storing products necessary for refrigeration or freezing and to control a temperature sensor built into an integrated structure of a single unit therein and a manufacturing method therefor.

BACKGROUND TECHNOLOGY

There has been a critical temperature indicator of a typical prior art that can be obtained as a commercial name "MONITOR MARK™" of 3M.

As shown in FIG. 1, the critical temperature indicator 10 includes an indicating material or development material layer 11 diffused with being reacted or melted at or above a predetermined temperature and a wicking member or development medium layer 12 absorbing a solvent from the development material layer 11. The development material layer 11 is referred to a temperature sensing layer mixed with ink and fatty acid or paraffin, and the development medium layer 12 is made of absorbing papers, non-woven fibers, etc. a barrier or isolation layer 13 is placed between the development material layer 11 and the development medium layer 12. A first major sheet or supporting layer 14 and an opposing second major sheet or both sided-adhesive tape 15 are in turn arranged on the lower portion of the development material layer 11. An indicating layer 16 includes indication windows to be arranged on the development medium layer 12, in which the indication windows includes larger indicating windows 16' and smaller indication windows 16" formed in a longitudinal direction thereon. A transparent layer 17 is positioned on the right of the indication layer 16.

On the other hand, the development medium layer 12, the indication layer 16 and the transparent layer 17 are provided with cutting portions 18 having the same size, respectively, on the same position of their one side. The temperature indicator 10 further includes a supporting layer 14 attached to the both sided-adhesive tape 15, on which the development material layer 11 and the development medium layer 12 are arranged on the supporting layer 14 with the isolation layer 13 positioned there between. Then, the transparent layer 17 is positioned on the indication layer 16 to finish the assembly of the temperature indicator 10.

Therefore, the temperature indicator 10 is attached to a predetermined position of a refrigeration product through the adhesive portion of the both sided-adhesive tape 15, the cutting portion 18 is removed there from and the isolation layer 13 is drawn out between the development material layer 11 and the development medium layer 12 to contact with each other.

Thereafter, the temperature indicator 10 begins to be operated in a manner that the development material 11 including a fluid of fat or paraffin with a pigment ink is melted, infiltrated into the development medium layer 12 and immigrated along the lengthwise thereof to indicate the storage state of the products through the indication windows 16' and 16".

But the temperature indicator has disadvantages in that the resultant product size becomes relatively bigger due to the mitigation of the development material in a longitudinal direction, requires a larger power of attention for removing the cutting layer between the development material layer and the development medium and layer. It is difficult to automate the manufacturing of the product. Since the development material is easily exposed to the air atmosphere without being sealed, it must be refrigerated or cooled for over one to two hours below a melting point thereof before being used. If it is used and melted at the state exposed to a normal temperature, some fluid of the development material adheres to the isolation layer when the isolation layer is removed.

Particularly, the development material is slowly migrated as being gradually far away from the starting point. For it, such like strip type of the temperature indicator has a disadvantage in that a error range of the temperature indication time is relatively greater.

Another typical prior art of U.S. Pat. No. 7,232,253 (US Unexamined Publication No. 2004/0240324 published on Dec. 2, 2004) discloses "A time indicator and method of manufacturing same". The time indicator comprises a first reservoir, a migration medium and activating means for bringing liquid from the first reservoir in contact with the migration medium so that after activation the liquid migrates through the migration medium producing a color change therein. The activating means comprises a second reservoir connected between the first reservoir and the migration medium whereby after activation the liquid travels relatively rapidly from the first reservoir to the second reservoir and then migrates relatively slowly along the length of the migration medium over time.

The patent has some characteristics in that it can measure the time elapse according to its operation and make a visible indication of the product life span. A pressure-rupturable seal or weak seal is formed to isolate a liquid conduit, as the activating means (of a convex dish type) that is constituted to be broken as the first reservoir is pressed with a predetermined amount of force. But the weak seal causes the temperature indicator to be mal-functioned due to the carelessness of users in use. Also, since it must be constructed so that liquid passing through the liquid conduit is contacted with the migration medium, the time indicator has disadvantages in that it is difficult to mass-produce the product due to a stringent configuration such as the weak seal, etc. and to store an enormous volume of products in one unit due to the convex dish type portion.

Another typical prior art of U.S. Pat. No. 6,957,623 discloses "A critical temperature indicator" enabling a visual, irresolvable indication under a critical temperature. The critical temperature indicator includes a transparent housing and a temperature sensitive transformable material operably contained within the transparent housing, which is a mixture of a stabilizer including water, latex, nucleating agent that is preferably ice nucleating active (INA) microorganism. The mixture is translucent prior to exposure of a predetermined temperature and is transformed at a predetermined temperature to render a substantially consistent opaque material, thereby precluding visibility there through and providing a sure visual sign that the indicator has been subjected to the predetermined temperature. Herein, the mixture of the stabilizer has an inherent color and is sealed in the form of a capsule and constituted as means for detecting the thawing and/or refrigeration/freezing of a product, but it has a problem in showing the state transformation of a system. In other words, it is not sure that the critical temperature indication of the system is the exact information of the management state from a time activated under the critical temperature or a time that it is possible to be exposed to a critical temperature, for example from a delivering time and a transformable time of a product having the system.

In order to resolve these problems, another typical prior art of International Patent Application WO/2007/148321 published on Dec. 27, 2007 discloses "An irreversible coolness indicator" which is a type of a critical temperature indicator. The critical temperature indicator comprises a sealed housing having at least one surface, which is transparent and contains a suspension if inorganic monoparticles are suspended in a liquid medium, wherein the suspension undergoes an irreversible detectible change in optical characteristics upon freezing of the liquid medium due to aggregation of the nanoparticles, and wherein the device is provided with means for association thereof with a product, whereby the temperature-threshold indicator device serves to determine whether the product has been exposed to an environment of predetermined coldness.

The critical temperature indicator has features in the simple configuration and the composition of the suspension showing the state transformation at a predetermined color according to a temperature for the refrigeration/thawing detection. But, the critical temperature indicator has some disadvantages in that it is difficult to lower the high manufacturing cost due to the suspension composition, to automate the mass-production thereof and especially to confirm a time to be exposed to the coldness environment. In other words, the critical temperature indicator also fail to show the management states of an activating time under a critical temperature and a time possibly exposed to a critical temperature, whereby the management state from a delivery time to a transformable time of a product cannot be confirmed.

Considering these points, it is preferable if a critical temperature indicator enable the confirmation of a use time point and has an exact operating mechanism there from, and the management state from a delivery time to a transformable time of a product is confirmed.

It is also preferable if a critical temperature indicator reduces the error range of a time exposed to a critical temperature from a time that the development material is first developed in a lengthwise in a strip type of a critical temperature indicator.

It is also preferable if a critical temperature indicator is convenient for the use, adapted to small refrigeration and freezing products and constructed as a simple configuration enabling the mass-production therefor.

DETAILED DESCRIPTION OF THE INVENTION

Technical Problem to be Solved

A main object of the invention is to provide a precise critical temperature indicator adapted to smaller refrigeration and freezing products without any restriction and for enabling the operating control of a sensor having an integrated configuration of a single body that a development medium member and a development material member are simply separated from or contacted with each other and manufacturing method therefor.

Another object of the invention is to provide a precise critical temperature indicator suitable for relatively smaller refrigeration and freezing products and for enabling the operating control of a temperature sensor and indicating the exposure state to a critical temperature, in which the temperature sensor includes at least one substrate divided on a single flat plate, a plurality of development medium members and a plurality of development material members properly put on the substrate and another portion constituted as an isolation member or a handle portion to separate the development medium member and the development material member from each other and manufacturing method therefor.

Another object of the invention is to provide a precise critical temperature indicator adapted to relative smaller refrigeration and freezing products without any restriction and for precisely controlling the migration of a development material from both sides of a development medium member in operating, in which the upper development medium member and the lower development material member with their both ends contacted on a mediate member are sealed together with a separation sheet being arranged there between to prevent their contact and manufacturing therefor.

Another object of the invention is to provide a precise critical temperature indicator including a plurality of temperature sensors which comprises a plurality of development medium members and a plurality of development material members with a separation sheet being arranged there between, both ends of which are contacted on a mediate member, for coupling the temperature sensors with an upper indication portion and a lower base portion supporting them and for enabling a mass production or assembly thereof.

Means to Resolve Problems

According to the invention, a precise critical temperature indicator and manufacturing method therefor is as follows: a plurality of development medium members and a plurality of development material members face to each other and a separation member is mounted therebetween to support the separation state of the development medium members and the development material members, the development medium member enables the speed adjustment in a manner to form and/or shorten a migration path thereon and an indication portion for indicating the state of the development material at the end or center of the development medium member and for enabling the mass-production of a plurality of temperature sensors and.

According to one embodiment of the invention, a precise critical temperature indicator comprises a single substrate divided into three portions including a first portion forming an indicating window at one portion thereof, a second portion extended from the first portion and a third portion detachably connected to the second portion; and a development medium member and a development material member each arranged on the first and second portions, so that the third portion including a handle portion to be cut out therebetween is folded thereon to form a temperature sensor, thereby removing the handle portion to contact the development material member and the development medium member with each other to enable the operation control of a system.

The single substrate includes the first portion provided with the development medium member, the second portion formed as a base plate that is provided with the development material member, a connection portion folded between the third portion and the second portion and the handle portion including a cutting line extended into the second portion, cut in a smaller width and then cut along the whole length in the opposite direction except for second connecting portions, thereby folding the third portion onto the base plate with the development material member and then the first portion with the development medium member thereon to integrate them into a single body.

The temperature sensor includes the development medium member on the first portion, the development material member and the third portion placed therebetween, in which the handle portion on the third portion is removed to contact them to each other and then according to the time elapse a predetermined color of a dye applied to the development material migrating along the development medium member is appeared on the indicating window, thereby enabling the critical temperature indication.

The development medium member includes a development medium in the threaded form of a circle, triangle or rectangular, etc. and a protection film made of vinyl, etc. to protect the development medium.

The development material member includes a rectangular development material and a protection film made of vinyl, etc. to protect the development material.

According to one embodiment of the invention, a manufacturing method of a precise critical temperature indicator comprises steps of dividing, scoring and perforating for cutting to form a plurality of single substrates on a single sheet, in which the single substrate is divided into three portions divided into three portions including a first portion forming an indicating window at one portion thereof, a second portion extended from the first portion and a third portion detachably connected to the second portion; loading the development medium member and the development material member, respectively, on two portions of the single substrate and positioning the other portion therebetween to separate them from each other to construct a temperature sensor; and inserting the third portion between them, thereby removing the handle portion to contact the development material member and the development medium member with each other to enable the operation control of a system.

According to another embodiment of the invention, a precise critical temperature indicator comprises a temperature sensor including an upper development medium member mounted on an immediate member, both ends of which meet each other to enable the development material to be migrated in both directions, a lower development material member having a development material on one side portion and an isolation sheet positioned between the upper development medium member and the development material member; a temperature indicating window receiving the development medium member, one end of which is projected from one side thereof; and a base portion positioned under the isolation sheet and sealed to enclose the development material therein.

According to another embodiment of the invention, a manufacturing method of a precise critical temperature indicator comprises steps of preparing an indicating unit including a plurality of indicating windows in the form of any one of a case and a flatness made of a synthetic resin film; preparing a development medium unit including an immediate member serving as a supporting piece which is expended in a lengthwise and a plurality of development medium members including development mediums of a plurality of porous films, both ends of which is folded to meet each other; preparing a sheet unit coupled with an indicating portion with a size corresponded or almost equal thereto; preparing a base unit to cooperate with a plurality of development medium members on the sheet unit positioning the development material members in a one to one correspondence on each of a plurality of base portions to cooperate with a plurality of development medium members on the sheet unit; positioning an isolation sheet member including a plurality of single isolation sheets between the development medium unit and the development material unit; positioning the development material unit and the isolation sheet member combined with each other on the base unit; loading the development medium units including the immediate member on the combined units; and sticking the indication unit and the base unit to each other and then welding/sealing them together using a high heat or a high frequency for the mass-production of a system.

The manufacturing method of the precise critical temperature indicator further comprises a step of forming a configuration of a double zipper in that both ends of the base unit and the indication unit in are combined with each other.

Therefore, the precise critical indicator is made cutting the temperature sensors one by one after combining the indicating unit that is integrated with a plurality of temperature sensors and the base unit with each other. The temperature sensor is operated by removing the isolation sheet between the development medium member and the development material member and indicates/warns the abnormal state of products at an exact elapse time point, as it is exposed to a temperature over the critical one and senses the critical temperature of the product.

Effect of the Invention

The invention can be constructed in a compact configuration and adapted to a smaller refrigeration and freezing product and can keep a development medium member and a development material member separated from each other at ordinary times. Furthermore, the invention can precisely and uniformly control the critical temperature indication heightening the migration speed of the development material Also, the invention can easily not only contact the development medium member and the development material member to each other by removing the isolation portion or even only a part thereof but also need not cool the development material member at below the critical temperature before use.

BRIEF DESCRIPTION OF IMPORTANT DRAWING REFERENCES

| 100: | Precise critical temperature indicator | 102: | First portion |
| --- | --- | --- | --- |
| 111: | Second portion | 121: | Third portion |
| 104: | Development medium | 112, 250: | Development material member |
| 240: | member | 122: | Second connecting portion |
| 108: | First connecting portion | 220: | Indication portion |
| 123: | Cutting line | 260: | Indication unit |
| 280: | Sheet unit | 200: | Development material unit |
| 290: | Development medium unit | | |
| 210: | Base unit | | |

DESCRIPTION OF THE PREFERRED EMBODIMENT

The invention will be explained in detail with reference to accompanying drawings, which has a configuration integrated into a single body.

Figure 1:
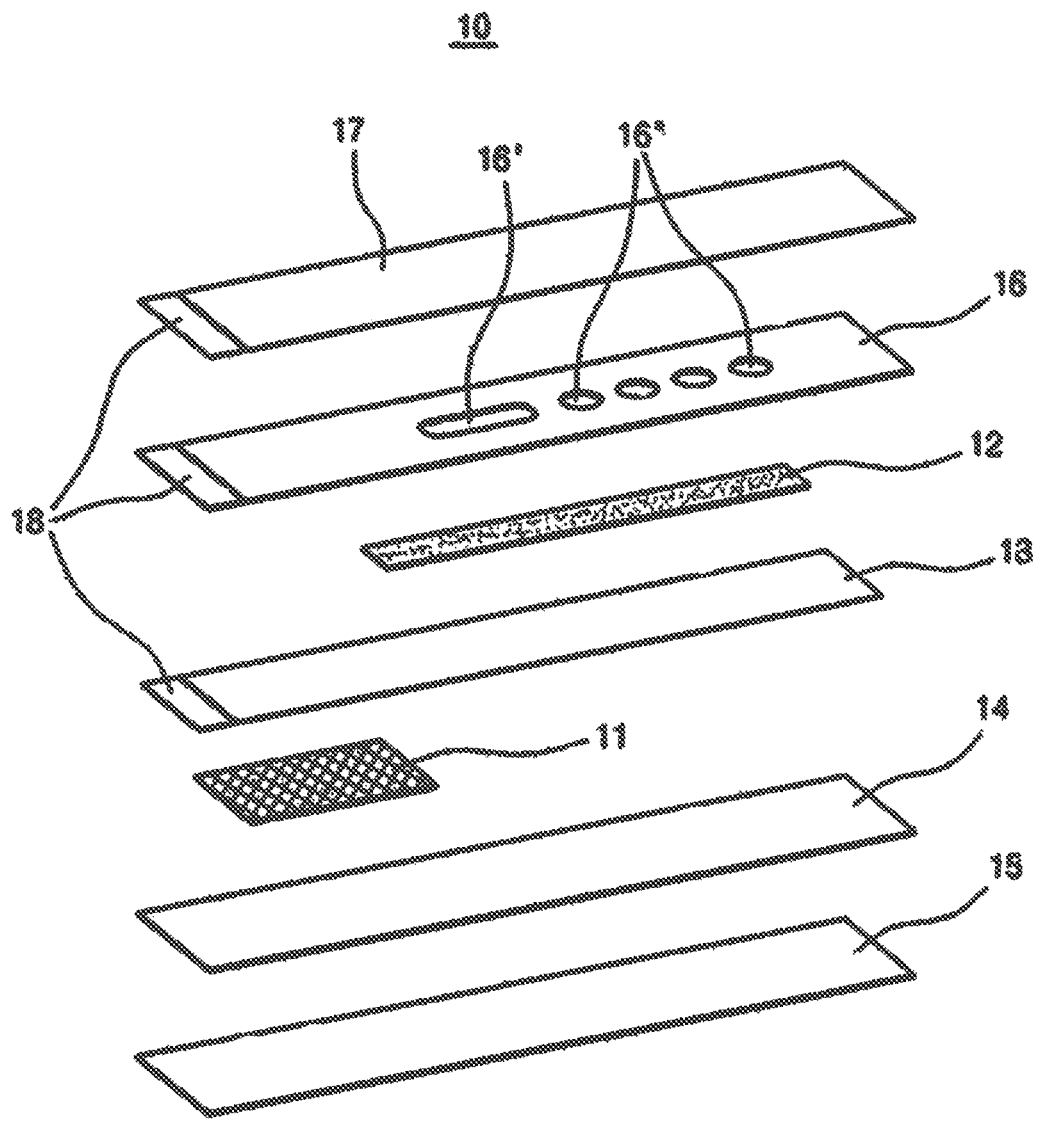
FIG. 1 is an exploded perspective view illustrating one example of a prior art in detail.
Figure 2:
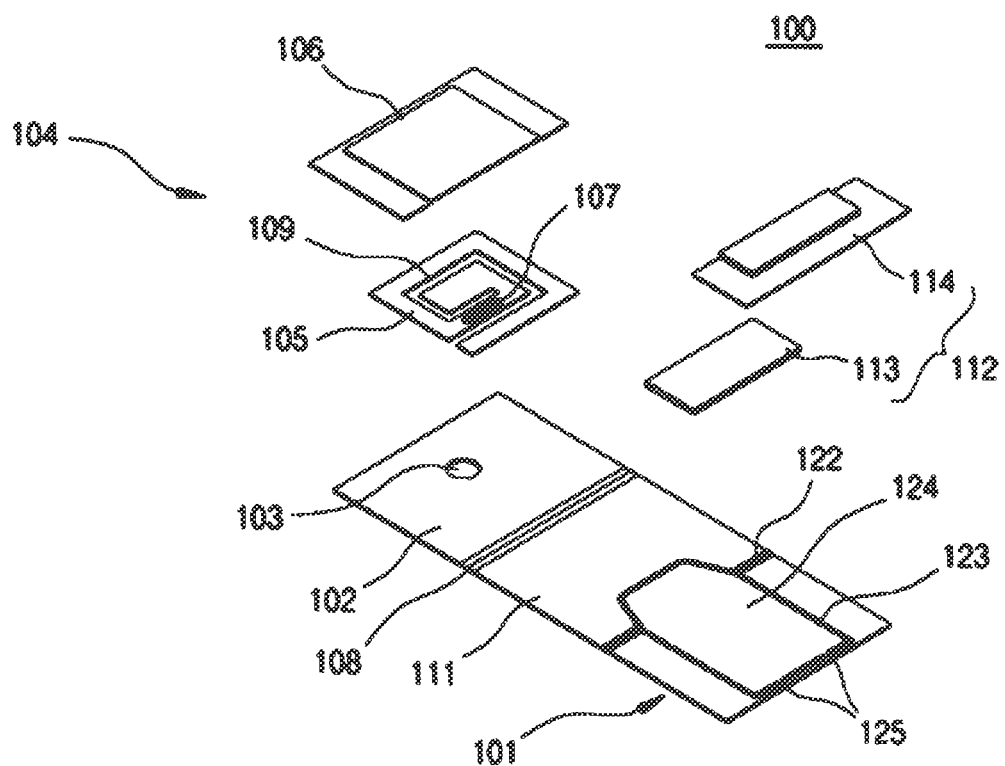
FIG. 2 is an exploded perspective view illustrating a critical temperature indicator provided with a temperature sensor in detail according to one embodiment of the invention.
Figure 3:
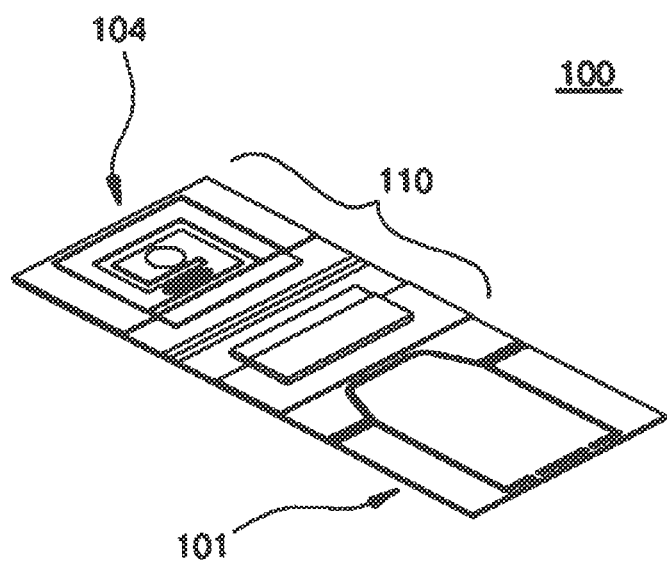
FIG. 3 is a plane perspective view illustrating the assembly state of a critical temperature indicator provided with a temperature sensor according to one embodiment of the invention.
Figure 4:
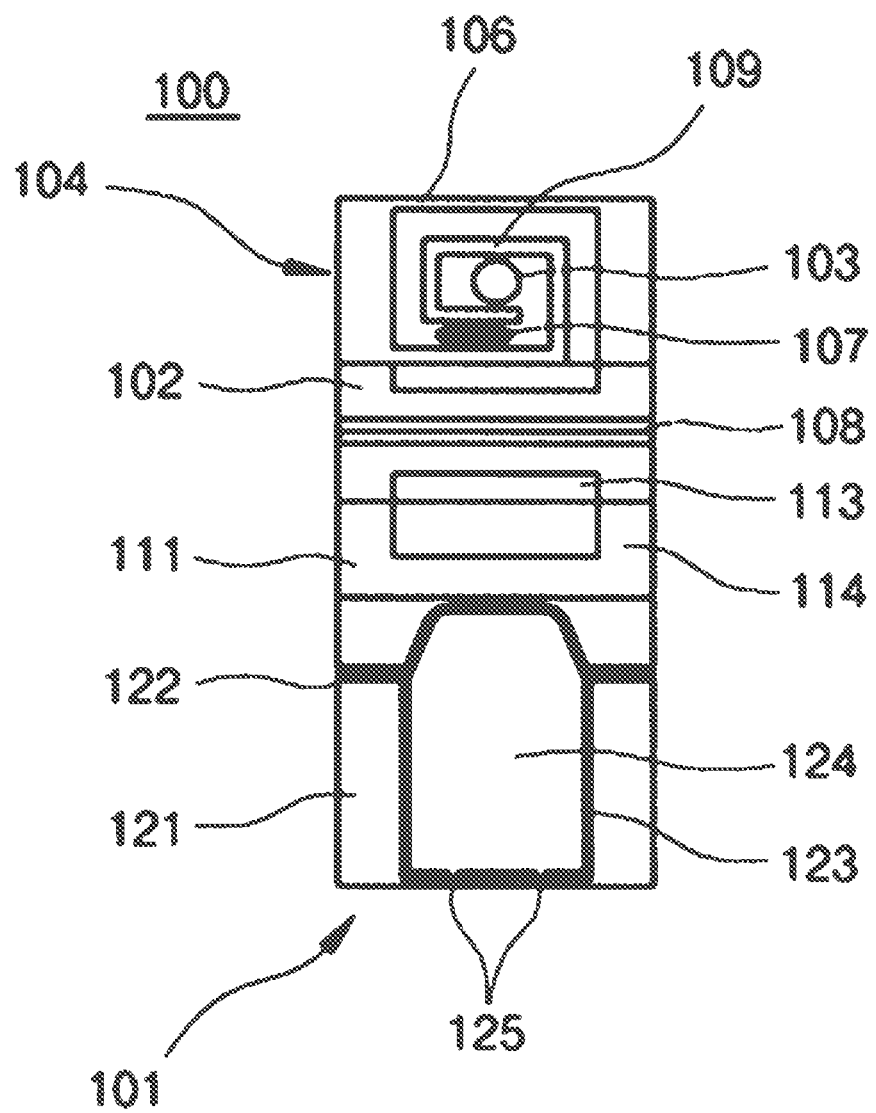
FIGS. 4, 5, 6 and 7 are plane views illustrating various forms of development material, dye applied positions and an indicating window position.
Figure 5:
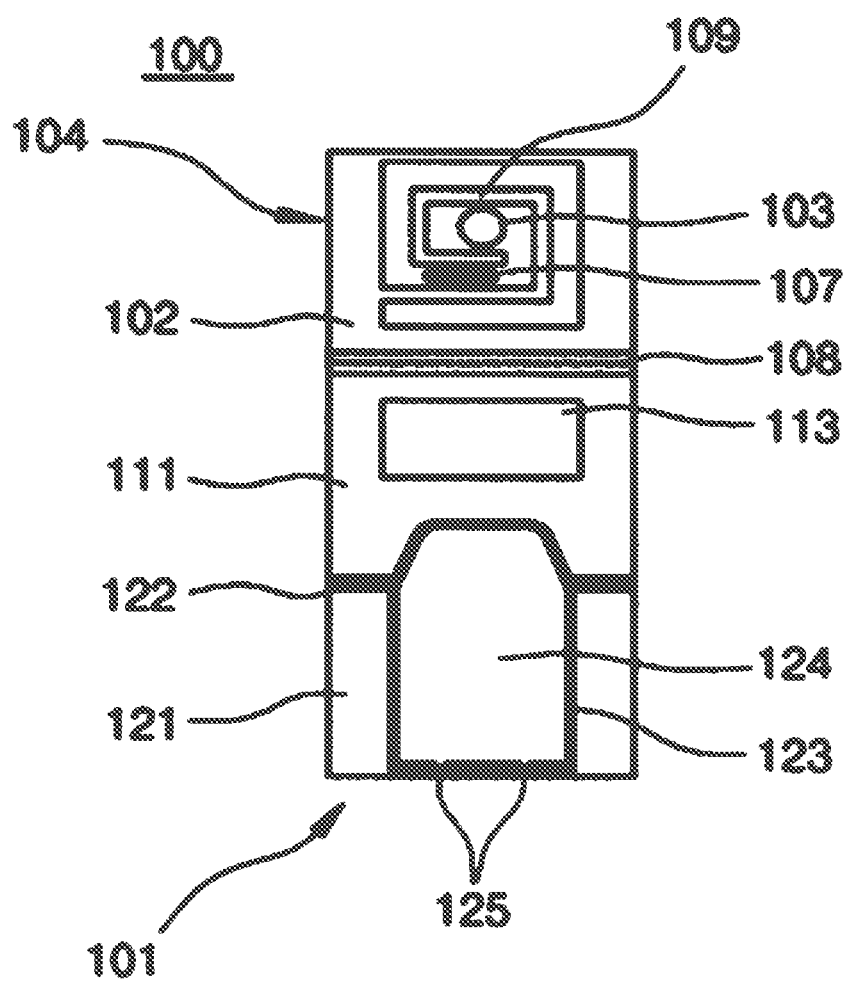
Figure 6:
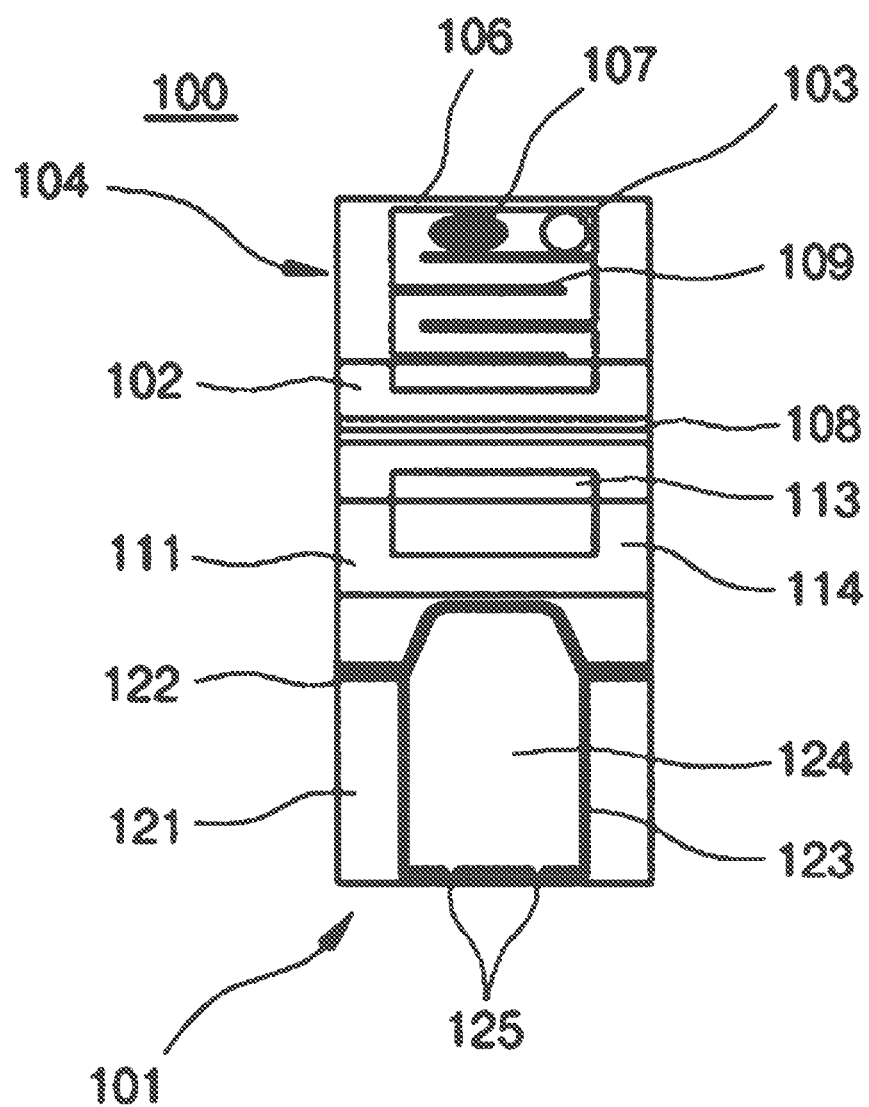
Figure 7:
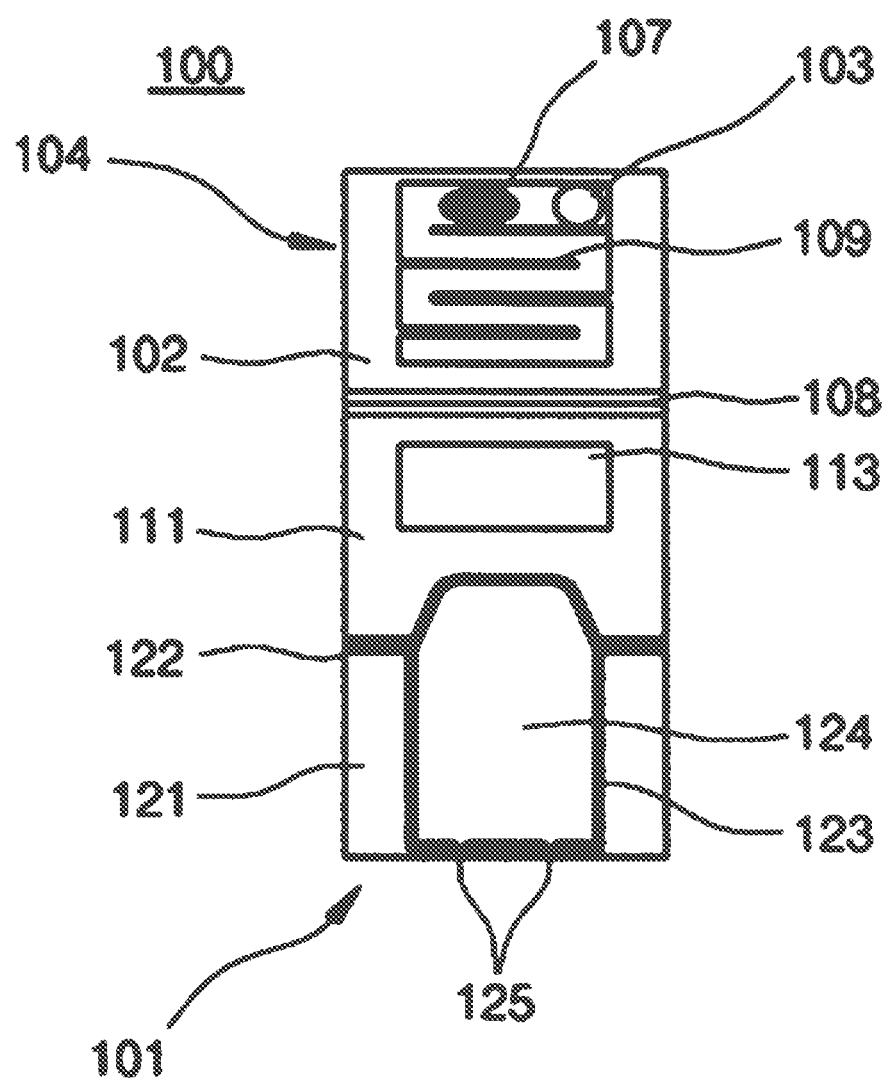

According to the invention, as shown in FIGS. 2 and 3 a precise critical temperature indicator 100 includes a single substrate 101 that is a single flatness plate. The single substrate 101 includes 3 portions foldable to each another. Among them a first portion 102 includes an indication window 103 formed adjacent to one edge or at a predetermined position of the center and a development medium member 104 having a predetermined area which is positioned in a side by side to the first portion 102. A liposoluble dye 107 is applied adjacent to one edge of a first protection film 106.

A second portion 111 acts as a base plate on which a development material member 112 is positioned. A second connecting portion 122 connects the second portion 111 to a third portion 121. The development material member 112 includes a development material 113 made of non-woven fibers and absorbing papers and a second protection film 113 made of vinyl, etc. to protect the development material 113.

The third part 121 includes a handle portion 124 extended in a relative smaller width by a predetermined length from one edge of the second portion 111 there into, on which a cutting line is formed along the whole length thereof. The handle portion 124 is positioned at the center of the third portion 121 and includes third connecting portions 125 not cut at one side thereof to be connected to the third portion 121.

In other words, there is scored a first connecting portion 108 between the first portion 102 and the second portion 111. There is scored the connecting portion 122 between the second portion 111 and the third portion 121 to form a foldable portion. Therefore, a temperature sensor 110 is configured as follows:

The temperature sensor 110 comprises the development medium member 104, the development material member 112 and the indication window 103. The development material 113 loaded on the development material member 112 is composed of a solvent containing fatty acid or fluid paraffin, which can be mixed with an ink having dye of a predetermined color if necessary. The development material 113 is dissolved at over a critical temperature of the surroundings, and the dissolved fluid is migrated along the development medium 105 as contacted with the front end thereof. At that time, the development medium 105 begins to manifest the color of a fatty dye 107, as the solvent of the development material 113 migrates and approaches. According to the time elapse at over a critical temperature, the manifested place is moved. Then at a predetermined delaying time, the manifested color is identified at the indication window 103 to check out the current state of the refrigeration or freezing product.

The development medium member 104 includes a first protection film 106 made of a transparent PTP known as Press Through Pack or vinyl, etc. to protect parts of the development medium 105 except for a front end portion thereof. Also, the development medium member 104 includes an extension portion 109 extended in a concentric circle or a threaded form from one end thereof to secure a predetermined length. The extension portion 109 may be the development medium 105 in the form of a circle, triangle or rectangular or serpentine type and many shapes as shown in FIGS. 4, 5, 6 and 7.

Also, the development medium member 104 includes a fatty dye on the upper portion thereof, so that the indication window 103 enable the manifestation color to be identified at a predetermined delaying time, as the development material 113 not dyed and contacted with the front end portion of the development medium 105 is solved and migrated along the extension portion 109.

On the other hand, it is noted that the single substrate 101 is configured to position the development medium member 104 on the first portion 102 and the development material member 112 on the second portion 111.

As shown in FIGS. 8, 9, 10 and 12, a precise critical temperature indicator 100 is to assembly a plurality of single substrates divided into three portions on a single sheet to be integrated into a single body for a mass-production.

Figure 8:
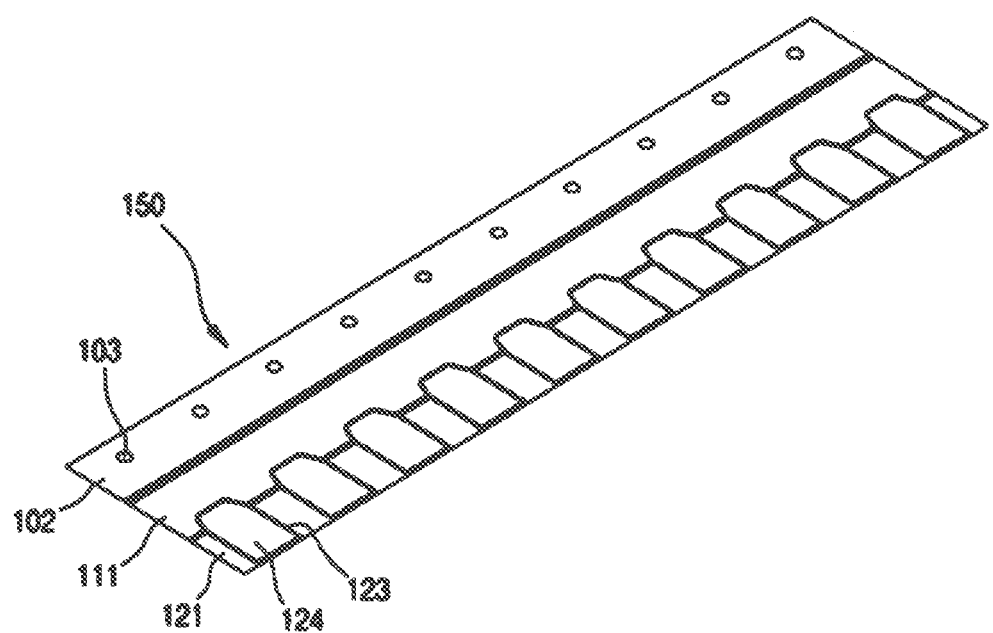
FIGS. 8, 9, 10, 11 and 12 are cross-sectional views illustrating a method for manufacturing a critical temperature indicator provided with a temperature sensor in large quantities in due order according to one embodiment of the invention.

As shown in FIG. 8, a single sheet 150 is made of a soft material such as PVC or PE etc., on which a plurality of single substrate 101 are formed. The single sheet 150 is scored, cut and perforated at once for each work adapted to a plurality of single substrates. Therefore, the work means the forming of an indication window 103 on a first portion 102, a first connection portion 108 between the first portion 102 and a second portion 111, a second connection portion 122 between the second portion 111 and a third portion 121 and a handle portion 124 having a cutting line 123 on the third portion 121.

Figure 9:
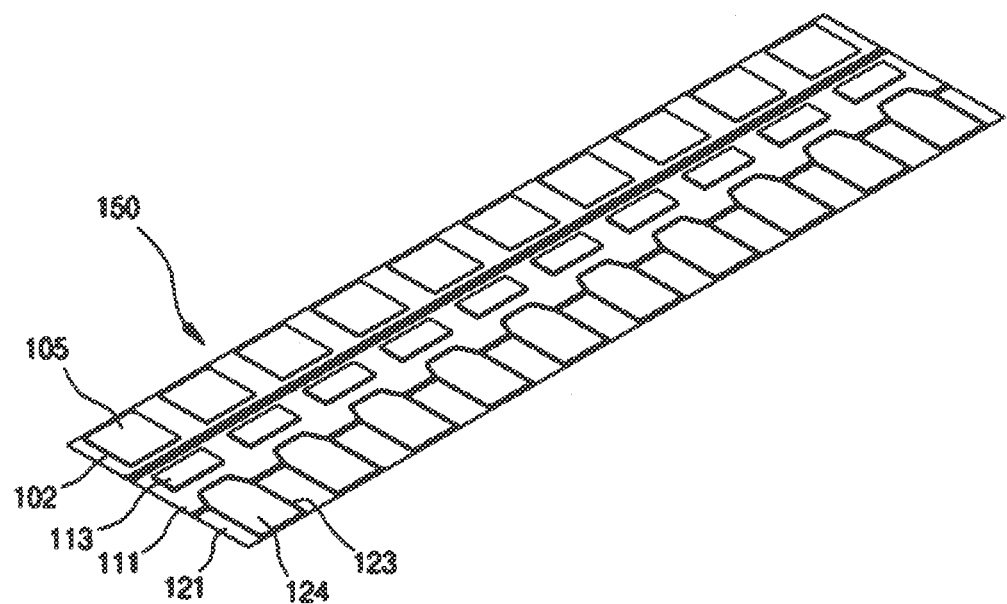

As shown in FIG. 9, the single sheet 150 includes a plurality of single substrates 101, on each of which the development medium 105 on the first portion 102 and the development material 113 on the second portion 111 are arranged.

Figure 10:
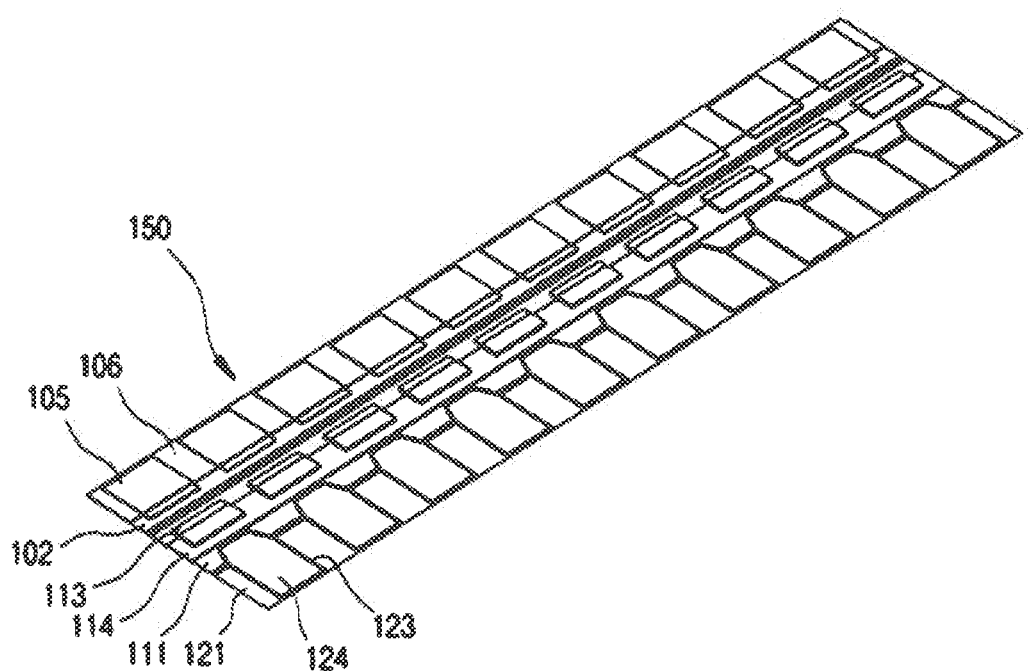

As shown in FIG. 10, a first protection film 106 and a second protection film 114 are respectively coated on the development medium 105 in the first portion 102 and the development material 113 in the second portion 111 which are arranged on each of a plurality of single substrates 101 of the single sheet 150. Therefore, the temperature sensor 110 is assembled and mounted on the single substrate 101.

Figure 11:
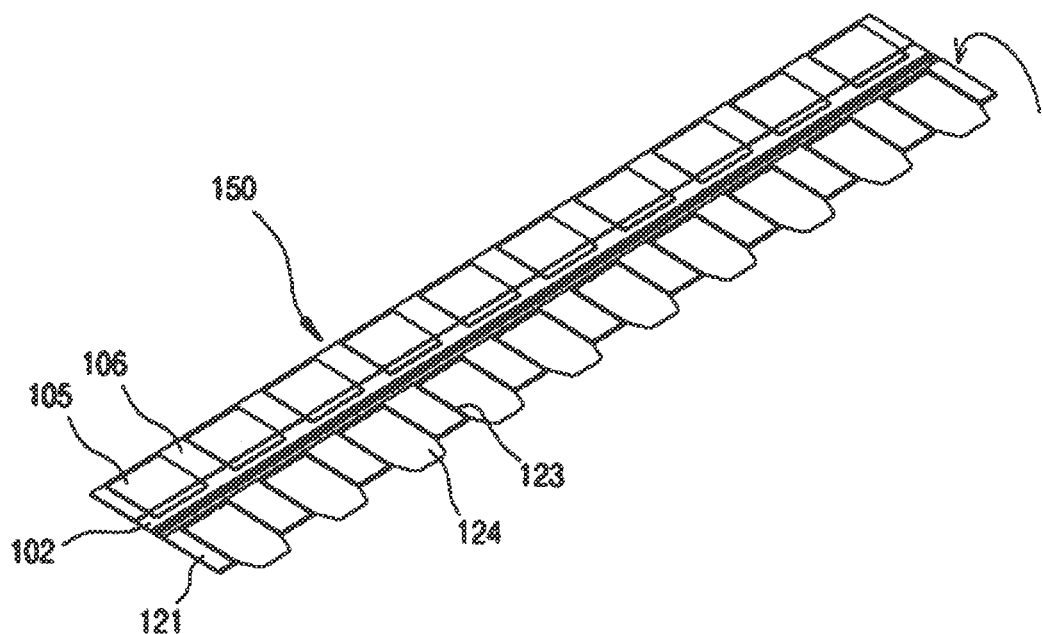

As shown in FIG. 11, as the temperature sensor 110 is mounted, the third portions 121 on the single substrates 101 connected with each another are folded on the second portion 111.

Figure 12:
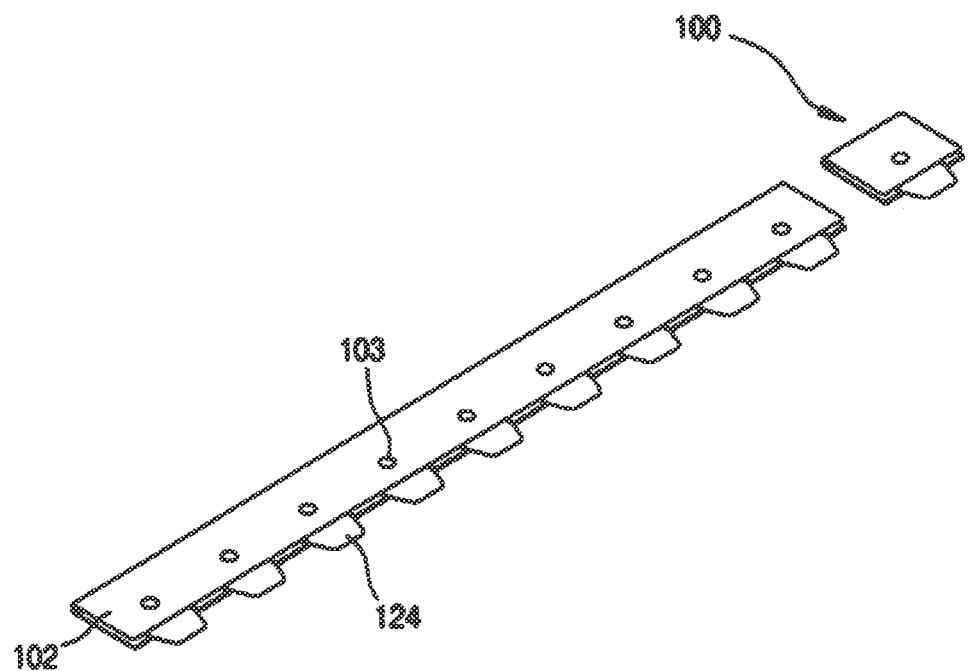

As shown in FIG. 12, with the temperature sensor 110 being mounted, the third portions 121 on a plurality of single substrates 101 are folded on the second portion 111, and the first portion 102 is folded on the third portion 121.

With the temperature sensor 110 being mounted, a plurality of single substrates 101 connected with each another is welded along their edges using a high frequency and cut to complete the assembly of the precise critical temperature indicator 100.

As described above, the precise critical temperature indicator 100 can be constructed at a size below 20 mm and fixed on even a little refrigeration or freezing products using both-sided adhesive tape. The temperature sensor 110 is operated in a manner to pull the handle portion 124 outside in one direction to contact the front end of the development medium 105 with the development material 113. As the development material 113 is solved at over a critical temperature of the surroundings in this state, the dissolved fluid is developed along the extension portion 109 of the development medium member 194. At that time, the dye applied to the front end of the development medium 105 begins to be manifested; the manifestation position is migrated according to the time elapse at over a critical temperature. At a predetermined delaying time, the color indication manifested at the indication window 103 is confirmed to check out the current state of a product to be stored.

Figure 13:
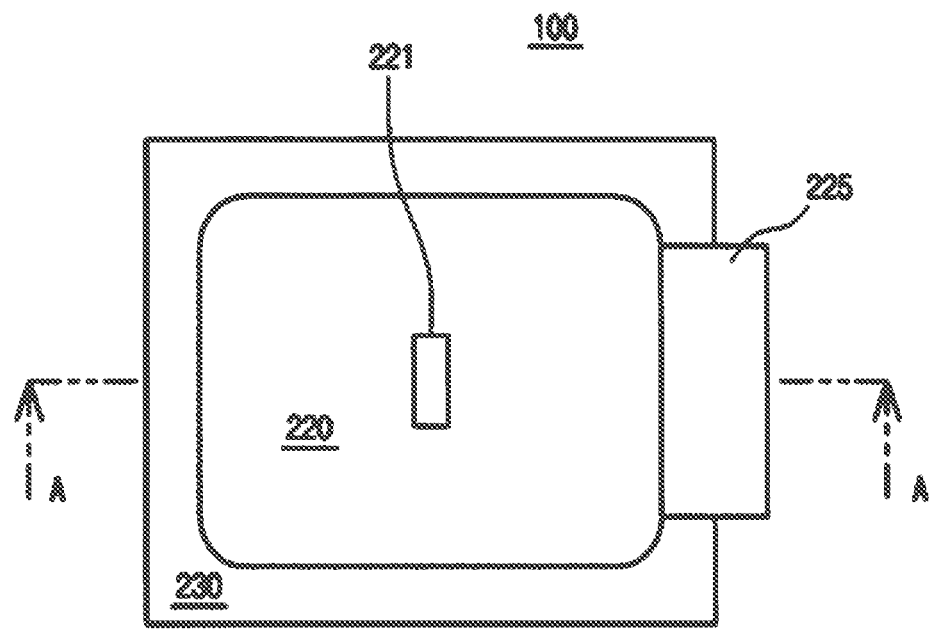
FIG. 13 is a plane view illustrating an upper portion of a precise critical temperature indicator according to other embodiment of the invention.
Figure 14:
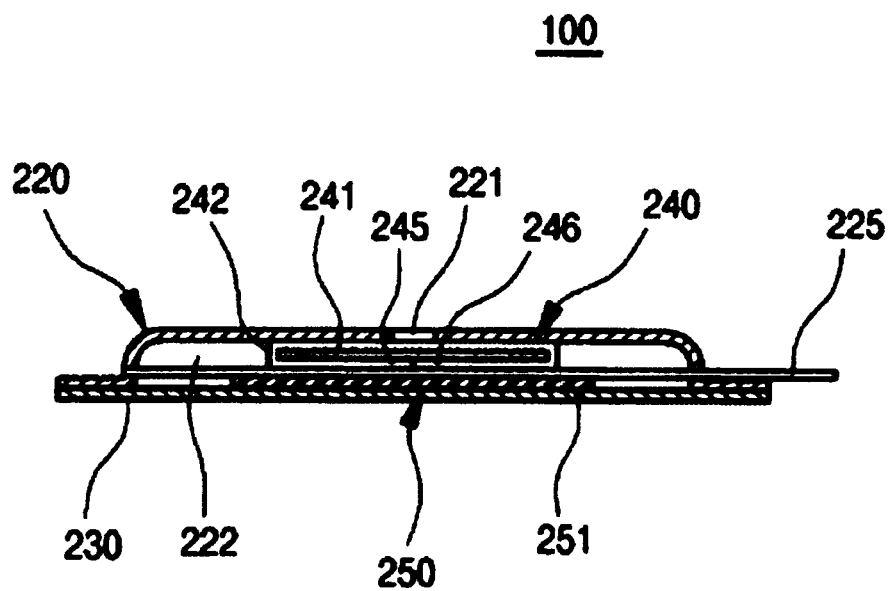
FIG. 14 is a cross-sectional view illustrating the assembly state of a precise critical temperature indicator according to other embodiment of the invention.
Figure 15:
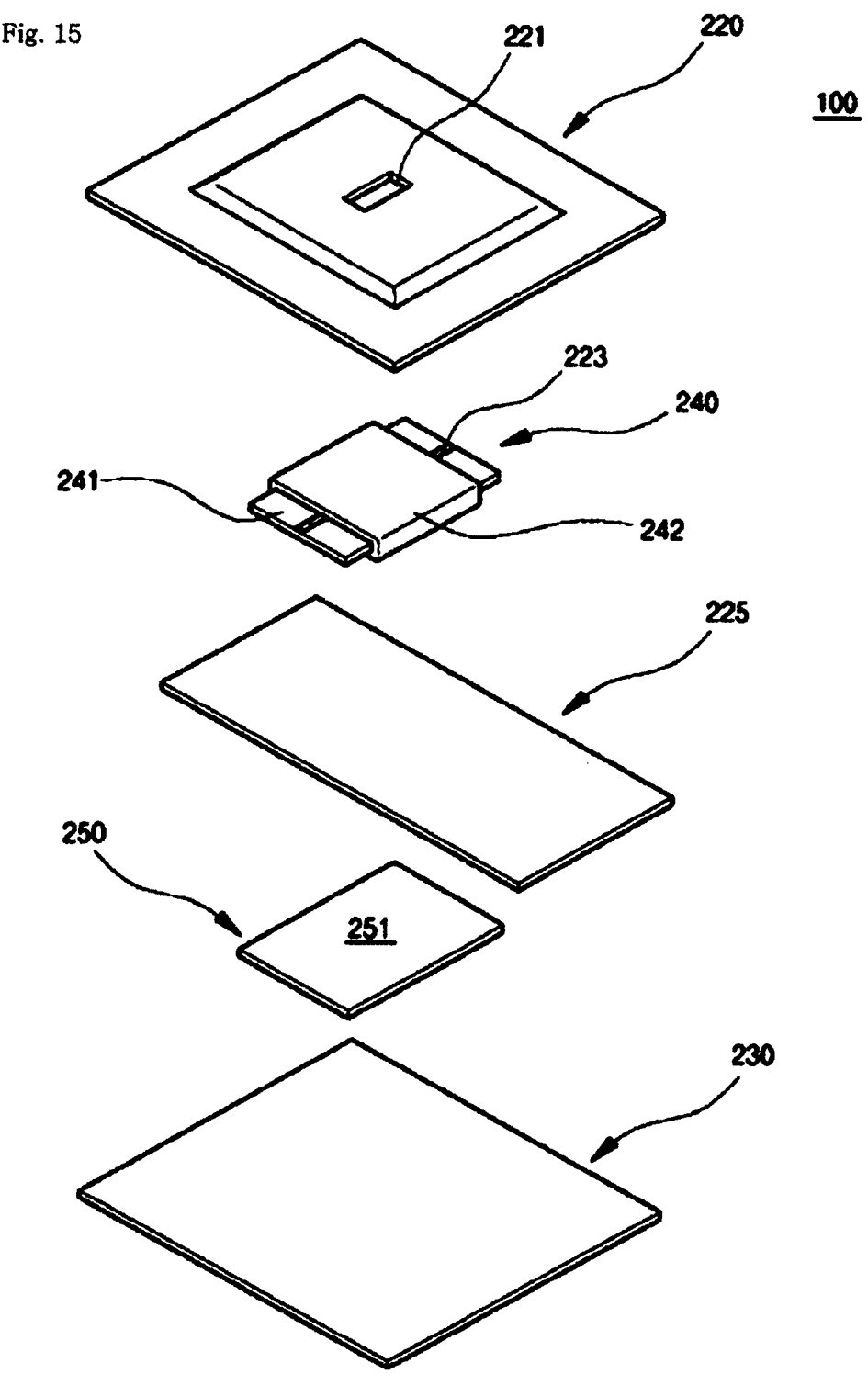
FIG. 15 is a detailed and exploded perspective view illustrating a precise critical temperature indicator according to other embodiment of the invention.

According to another embodiment of the invention, as shown in FIGS. 13 and 14, a precise critical temperature indicator 100 is integrated into a single body and includes a temperature indication portion 220 on an upper portion thereof, a base portion 230 on a lower portion thereof and a separation sheet 224 projected therebetween. The temperature indication portion 220, the upper portion of which is opaquely printed on parts except for an indication window 221 made of transparent synthetic resins, is previously molded in the form of a case receiving a development medium member 240 but made as a flat configuration all over. Herein, it is desirable to construct a portion except for the indication window 221 as an opaque printing portion.

The development medium member 240 includes a single supporting piece 241 made of an opaque sheet rather than a transparent one such as PE, PP, PET, PC, etc. in a predetermined size and a development medium 242 wound around the development medium 242 to meet both ends 245 and 246 thereof with each other. Herein, it is noted that both ends 245 and 246 can be unfolded in the opposite direction with each other being faced. The supporting piece 241 is constituted as an immediate member extended in a lengthwise or printed in a solid line on a center axis, which has an opaque color. The development medium 242 is made of a porous extended film or a silica extended film.

The development material member 250 is constituted as non-woven fiber 251 for absorbing a development material such as fatty acid, etc.

The base portion 230 is constituted as a lower portion made of a synthetic resin film such as transparent or opaque PE, PP, PET, PC, PVC, etc.

Therefore, the precise critical temperature indicator 100 includes the development material member 250 positioned on the center of the base portion 230 and the separation sheet 225 loaded on the development material member 250. The temperature indication portion 220 is configured to contain the development medium member 240 in a receptacle 222 positioning the isolation sheet 225 between the development material member 250 and the development medium member 240, in which the center of the development medium 240 is positioned directly under the indication window 221. At that time, the separation sheet 225 is projected in parts from the receptacle 222 in the indication portion 220.

On the other hand, the precise critical temperature indicator 100 is made welding the temperature indication portion 220, the supporting piece 241 and the base portion 230 at once using a high heat or a high frequency, which are made of PE, PP, PC, etc. having a relative lower melting point. At that time, the isolation sheet 225 is made of PET having a relative higher melting point and not welded at the melting point of the temperature indication portion 220, the supporting piece 241 and the base portion 230.

Herein, the supporting piece 241 is printed to have a solid line 223 on the center portion thereof and made of an opaque synthetic resin member. The development medium 242 may be made cutting a sheet that is made of commercially porous extension films or silica coated porous extension films. The development material may be composed of a colorless transparent fatty acid or paraffin, silicon oil.

On the basis of such like a configuration, as the temperature sensor is operated with the removal of the isolation sheet 225, the development material such as fatty acid oil impregnated into non-woven fiber is applied to both ends 245 and 246 of the development medium 242 at once, migrated to get the porous extension film to become transparent. Then the color tone of the supporting piece 241 directly below the indication window 221 on the upper of the indication portion 220 or the solid line 223 printed at the center is exposed to manifest the color thereof.

Figure 16:
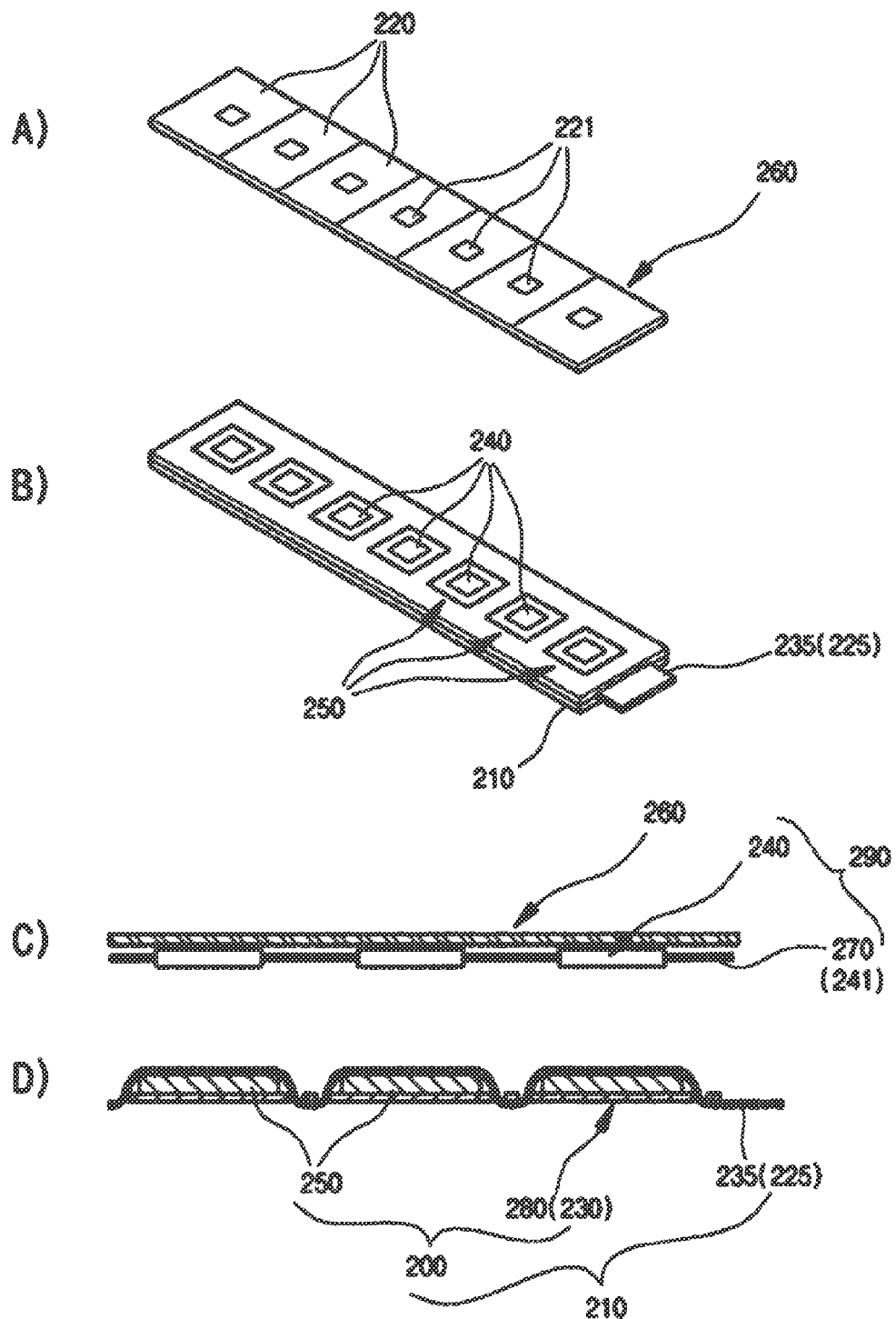
FIGS. 16, A, B, C and D are views illustrating a method of mass-manufacturing a precise critical temperature indicator through the assembly according to another embodiment of the invention.

According to another embodiment of the invention, as shown in FIGS. 16, A and B, a manufacturing method of a precise critical temperature indicator 100 comprises a step of preparing an indication unit 260 including a plurality of indication portions 220 which made of a synthetic resin film and in the form of an upper case and a flat type.

The temperature sensing portion includes a plurality of development material members 250, a plurality of development medium members 240 and an isolation sheet member 235 extended therebetween and mounted under the lower portion of the indication portion 220.

More particularly, as shown FIGS. 16, C and D, a development medium unit 290 is prepared so that an immediate member 270 is constituted as a plurality of supporting pieces extended in a lengthwise, and a plurality of development medium member 240 made of a porous film meet both ends at numerous positions to be surrounded.

Then, a base unit 210 having an area formed as a plurality of base portions 230 is prepared to have a size identical or similar to one of the development medium unit 290 so that it is positioned on the lower of the development medium unit 290 including an indication unit 260.

A plurality of development material members 250 is positioned on the base unit 210 corresponding to the development medium member 240 at their upper and lower portions.

A separation sheet member 235 made of a thin synthetic resin is positioned on the base unit 210 to package a plurality of development material 250 constituted as a plurality of development material units 200, each of which cooperates with a plurality of development medium member 240 constituted as a development medium unit 290.

Next, a sheet unit 280 is welded using a high temperature or a high frequency together with the indication unit 260 and the base unit 210 stuck to each other after loading the development medium unit 290 provided with the immediate member 270 on the base unit 210 that the development material unit 200 is covered with the separation sheet member 235.

Figure 17:
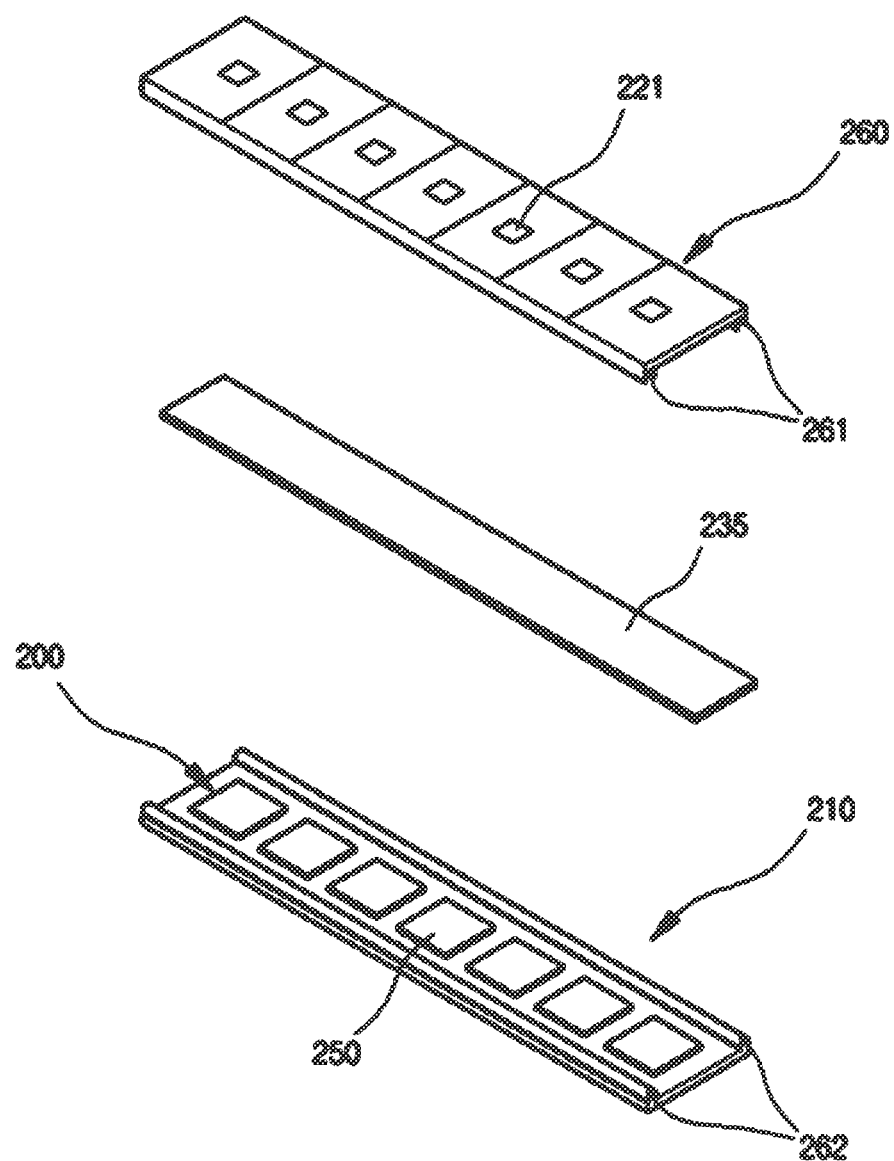
FIG. 17 is an exploded perspective views illustrating a method of mass-manufacturing a precise critical temperature indicator through its assembly according to another embodiment of the invention.

Also, as shown in FIG. 17, the precise critical temperature indicator 100 may be manufactured in larger quantities to have a configuration of a dual zipper. To it, first a coupling portion 261 having a groove is formed on both cross-sections of the indication unit 260, and projectors 262 extended in a length to be fitted into the groove of the coupling portion 261 are formed on both sides of the base unit 210.

On the indication unit 260 the development medium unit 290 (not shown) is positioned by the reference of a plurality of indication windows 221, and on the base unit 210 there is positioned the development material unit 200.

Thereafter, as the development material unit 200 including a plurality of the development material members 250 is arranged on the base unit 210, and then the indication unit 260 is positioned on the development material unit 200, so that they are assembly in a dual zipper configuration with both side ends being coupled to each other.

What is claimed is:

1. A precise critical temperature indicator comprising:
    a temperature sensor including an upper development medium member having a first end and a second end mounted on an immediate member, the first and second ends of which meet each other to enable development material to be migrated in both directions, a lower development material member having a development material on one side portion and an isolation sheet positioned between the upper development medium member and the development material member;
    a temperature indicating window receiving the development medium member; and
    a base portion positioned under the temperature indicating window and sealed to enclose the temperature indicating window therein.

2. A precise critical temperature indicator of claim 1, wherein the development medium member allows the development material to be applied to the first and second ends thereof, so that the development materials are developed in directions in the opposite to each other.

3. A precise critical temperature indicator of claim 1, wherein the development medium is covered with any one of porous extension film and silica layers.

4. A manufacturing method of a precise critical temperature indicator comprising steps of:
    preparing an indicating unit including a plurality of indicating windows in the form of any one of a case and a flatness and made of a synthetic resin film;
    preparing a development medium unit including an immediate member serving as a supporting piece which is expended in a lengthwise and a plurality of development medium members including development mediums of a plurality of porous films and first and second ends, the first and second ends of which are folded to meet each other;
    preparing a sheet unit coupled with an indicating portion of the indicating unit with a size corresponded or almost equal thereto;
    preparing a base unit to cooperate with a plurality of development medium members on the sheet unit positioning a plurality of development material members in a one to one correspondence on each of a plurality of base portions to cooperate with the development medium members on the sheet unit; positioning an isolation sheet member including a single isolation sheet between the development medium unit and the development material unit;
    positioning the development material unit and the isolation sheet member combined with each other on the base unit; and, loading the development medium units provided with the immediate member thereon and then sealing the indication portion unit and the base unit to be welded into one by a heat melting or an ultrasonic juncture for the mass-production of a plurality of precise critical temperature indicators.

5. A manufacturing method of a precise critical temperature indicator of claim 4, wherein the base unit and the indication portion unit is constructed to have a dual zipper configuration on an end of the base unit and an end of the indication portion unit.

* * * * *